(12) United States Patent
Nakatsugawa et al.

(10) Patent No.: US 11,769,050 B2
(45) Date of Patent: Sep. 26, 2023

(54) PREDICTING DEVICE, TRAINING DEVICE, STORAGE MEDIUM STORING A PREDICTION PROGRAM, AND STORAGE MEDIUM STORING A TRAINING PROGRAM

(71) Applicant: Toyota Jidosha Kabushiki Kaisha, Toyota (JP)

(72) Inventors: Eiji Nakatsugawa, Tokyo-to (JP); Seiji Yamashita, Nagoya (JP); Yasushi Dohnoue, Seto (JP); Hidenori Morita, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 200 days.

(21) Appl. No.: 17/355,479

(22) Filed: Jun. 23, 2021

(65) Prior Publication Data

US 2022/0027729 A1    Jan. 27, 2022

(30) Foreign Application Priority Data

Jul. 22, 2020  (JP) .................. 2020-125712

(51) Int. Cl.
*G01H 15/00* (2006.01)
*G06N 3/04* (2023.01)
(Continued)

(52) U.S. Cl.
CPC ............. *G06N 3/08* (2013.01); *G01H 15/00* (2013.01); *G06N 3/04* (2013.01); *G01H 13/00* (2013.01)

(58) Field of Classification Search
CPC .......... G06N 3/08; G06N 3/045; G06N 20/00; G01H 3/00; G01H 17/00; G01H 15/00; G01H 1/00; F16F 13/10; F16F 2230/0047
(Continued)

(56) References Cited

U.S. PATENT DOCUMENTS

2003/0065482 A1 * 4/2003 Bechhoefer ........ G05B 23/0254
702/183
2005/0155431 A1 * 7/2005 Fukuyama ........... G01N 29/045
73/649
(Continued)

FOREIGN PATENT DOCUMENTS

JP    2008-249610 A    10/2008
JP    2015-104966 A    6/2015
(Continued)

*Primary Examiner* — Jeffrey P Aiello
(74) *Attorney, Agent, or Firm* — Dinsmore & Shohl LLP

(57) ABSTRACT

A predicting device, including a processor configured to: acquire displacement data that expresses a time series of displacements at respective points in time that are input to a vibration proofing member, and velocity data that expresses a time series of velocities at respective points in time that are input to the vibration proofing member; generate first load data of the vibration proofing member by inputting the acquired displacement data and velocity data into a model that is for inferring, from the displacement data and the velocity data, load data; generate second load data of the vibration proofing member by inputting the acquired displacement data and velocity data into a regression trained model that is for inferring, from the displacement data and the velocity data, load data; and infer load data relating to the vibration proofing member by adding together the generated first load data and the generated second load data.

7 Claims, 17 Drawing Sheets

(51) Int. Cl.
*G06N 3/08* (2023.01)
*G01H 13/00* (2006.01)

(58) Field of Classification Search
USPC ..... 702/56, 173, 41, 141, 175, 179, 181, 33;
73/152.47, 861.355–861.356; 280/735;
375/240.16; 700/280; 703/1–6; 706/12
See application file for complete search history.

(56) References Cited

U.S. PATENT DOCUMENTS

| | | | | |
|---|---|---|---|---|
| 2010/0030478 | A1* | 2/2010 | Saitoh | G01M 7/08 |
| | | | | 702/14 |
| 2012/0098177 | A1* | 4/2012 | Satou | F16F 7/1011 |
| | | | | 267/140.14 |
| 2012/0123757 | A1* | 5/2012 | Ertas | E21B 45/00 |
| | | | | 703/2 |
| 2016/0377076 | A1* | 12/2016 | Mori | G01H 1/00 |
| | | | | 702/182 |
| 2019/0146478 | A1* | 5/2019 | Cella | G01M 13/045 |
| | | | | 702/188 |

FOREIGN PATENT DOCUMENTS

| | | | |
|---|---|---|---|
| JP | 2019-101490 A | | 6/2019 |
| JP | 2019101490 A | * | 6/2019 |

* cited by examiner

FIG.7A
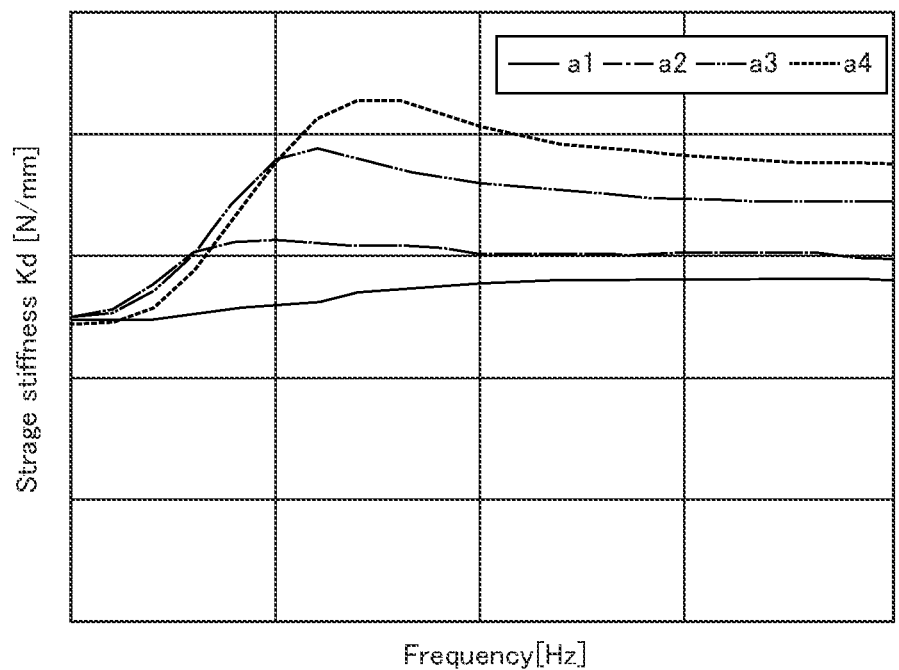
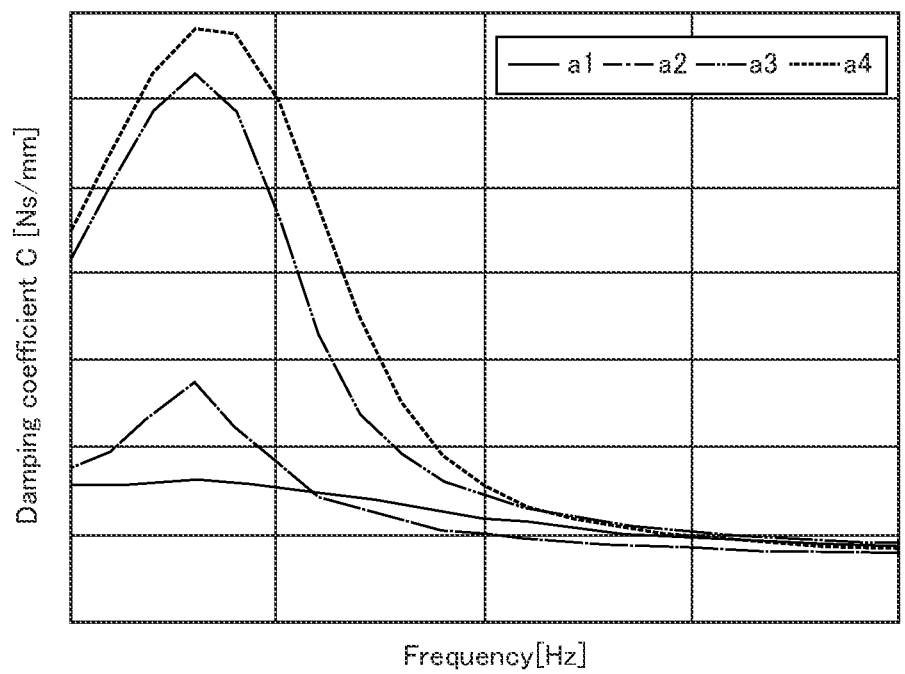

FIG.7B
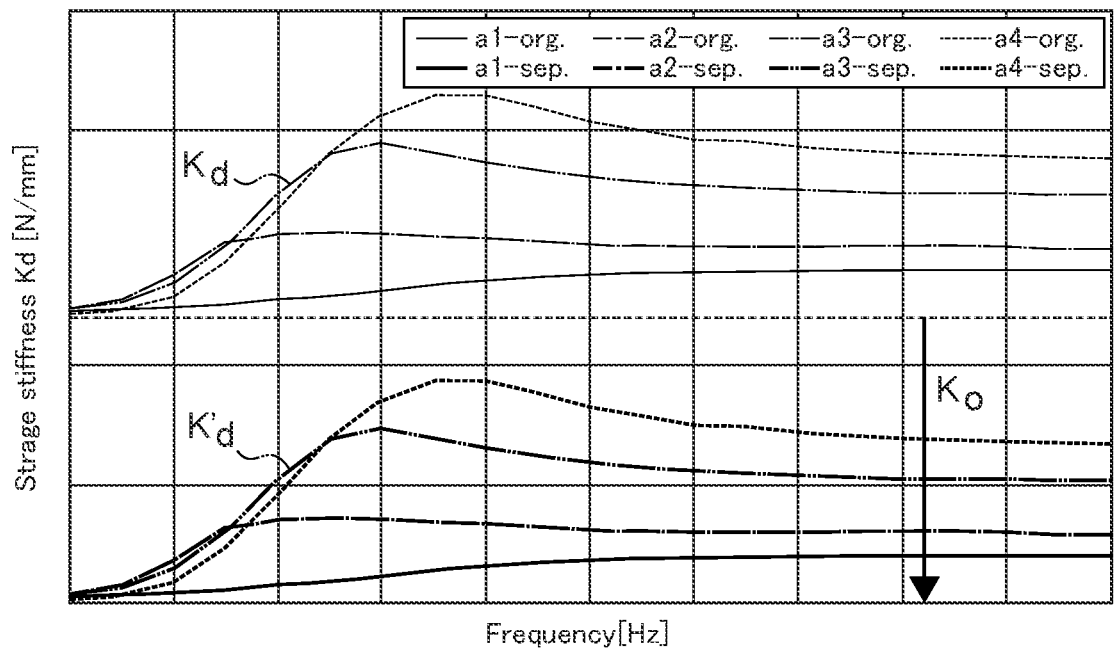
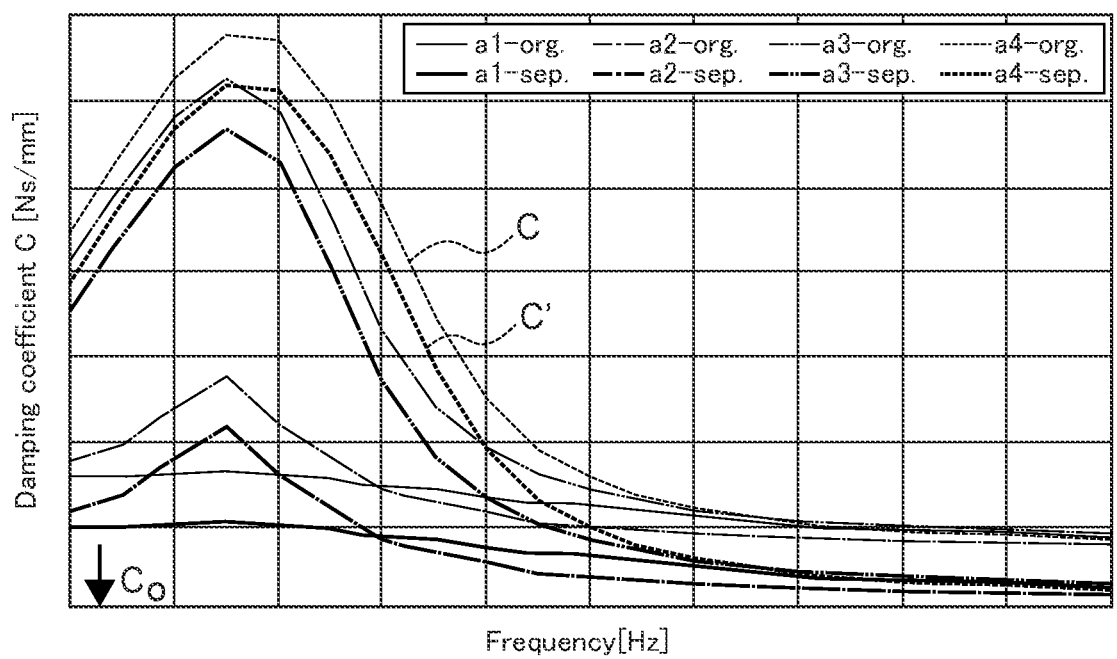

FIG.7C
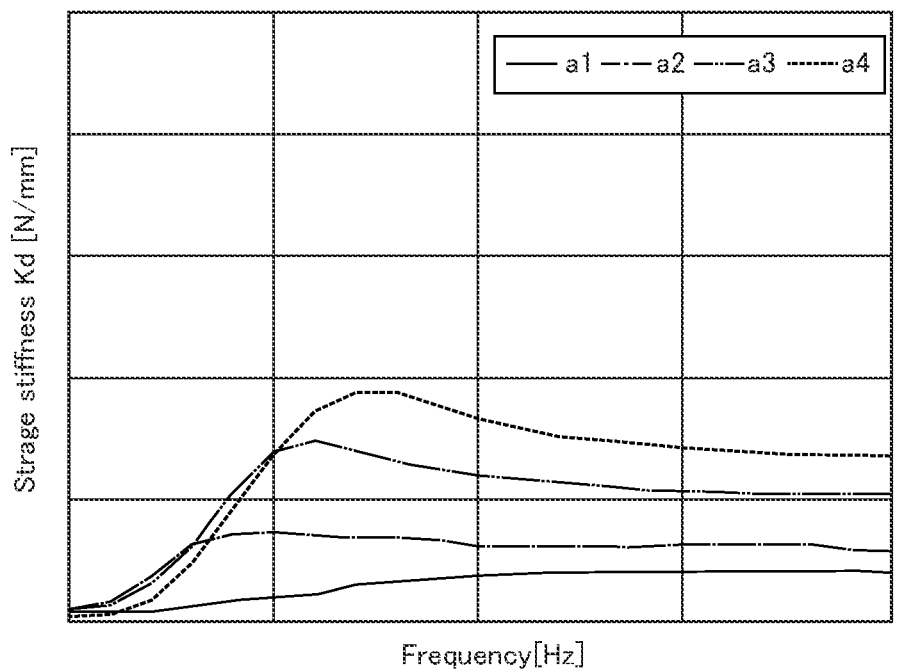
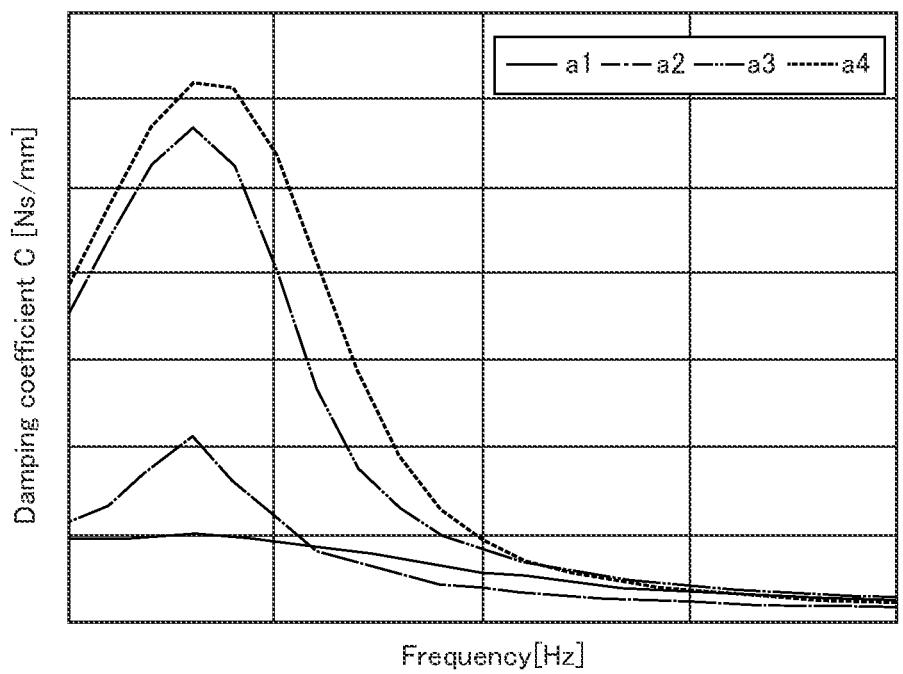

FIG.8
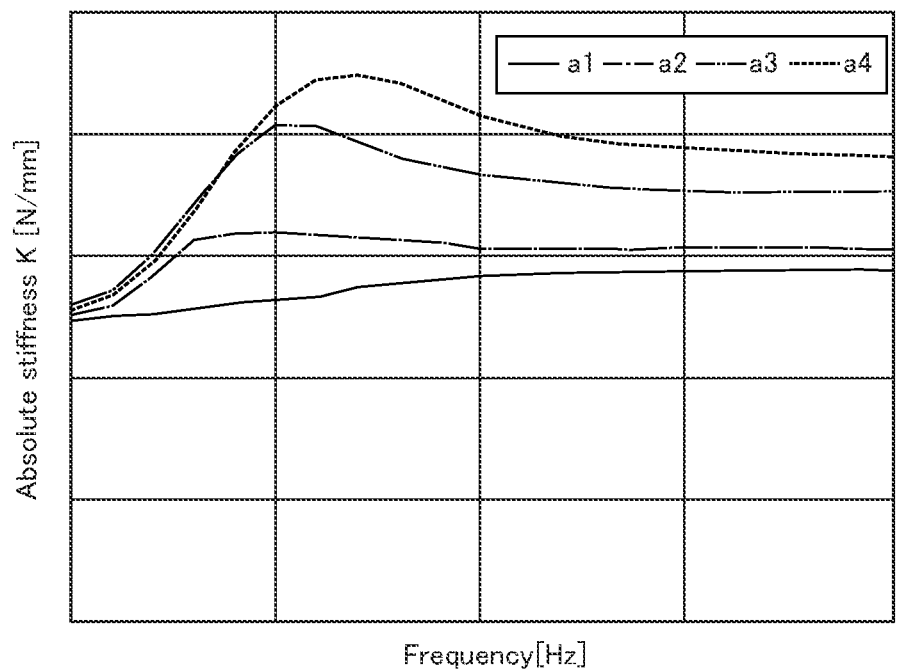
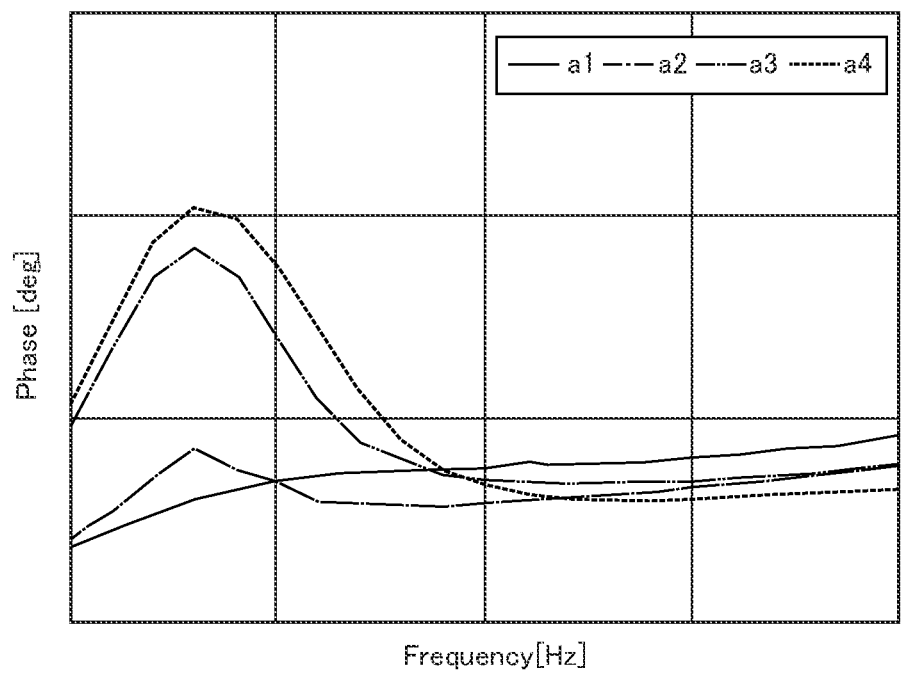

FIG.9

| ID | DISPLACEMENT DATA | VELOCITY DATA | LOAD DATA |
|---|---|---|---|
| 00001 | X1 | Y1 | Z1 |
| 00002 | X2 | Y2 | Z2 |
| ... | ... | ... | ... |

FIG.15

| MASS | REGRESSION NEURAL NETWORK ONLY | MODEL OF PRESENT EMBODIMENT THAT IS DIVIDED INTO LINEAR CHARACTERISTICS AND NON-LINEAR CHARACTERISTICS |
|---|---|---|
| 100kg | Stable | Stable |
| 60kg | Stable | Stable |
| 30kg | Stable | Stable |
| 20kg | Unstable | Stable |

PREDICTING DEVICE, TRAINING DEVICE, STORAGE MEDIUM STORING A PREDICTION PROGRAM, AND STORAGE MEDIUM STORING A TRAINING PROGRAM

CROSS-REFERENCE TO RELATED APPLICATION

This application is based on and claims priority under 35 USC 119 from Japanese Patent Application No. 2020-125712 filed on Jul. 22, 2020, the disclosure of which is incorporated by reference herein.

BACKGROUND

Technical Field

The present disclosure relates to a predicting device, a training device, storage medium storing a training program, and a storage medium storing a training program.

Related Art

Time series data predicting devices, which predict future values in time series data with high accuracy, are conventionally known (see, for example, Japanese Patent Application Laid-Open (JP-A) No. 2019-101490). The time series data predicting device disclosed in JP-A No. 2019-101490 selects some data of received time series data, and stores the selected data in data storage information, and, in accordance with free space in the data storage information, compresses plural data that are stored in the data storage information so as to create compressed data, and increases the free space of the data storage information.

Then, on the basis of the data and the compressed data of the data storage information, the time series data predicting device generates a predicting model that predicts future values of the time series data. A predicting section predicts future values of the time series data on the basis of the predicting model and a partial time series that is an object of prediction in the time series data.

When predicting the behavior of some objects, there are cases in which the object has a non-linear characteristic. In such a case, at the time of predicting the behavior of the object, for example, a neutral network that is an example of a machine learning model, or the like, is used. A regression neural network that is an example of a machine learning model is effective because it can predict the behavior of an object having a non-linear characteristic by using the time series data of the object.

For example, a vibration proofing member that is installed in a vehicle has a non-linear characteristic. Therefore, the behavior of a vibration proofing member of a vehicle can be predicted by using a regression learning model such as a regression neural network or the like. The data that is used at the time of predicting the behavior of a vibration proofing member is, for example, data of vibrations that are input to the vibration proofing member, or the like, and this data of vibrations fluctuates greatly on the time axis.

A regression learning model such as a regression neural network or the like predicts the behavior of an object by using data of the current point in time and data up to the previous point in time. Here, a case is considered in which data that fluctuates greatly on the time axis, such as vibration data or the like, is input into a regression learning model, and the behavior of a vibration proofing member is predicted. In this case, the regression learning model cannot properly take into consideration data up to the previous point in time that fluctuates greatly, and there is the problem that the prediction accuracy deteriorates.

The technique disclosed in JP-A No. 2019-101490 generates a model that predicts future values of time series data on the basis of compressed data, but the accuracy thereof is not considered, and moreover, the technique does not relate to a vibration proofing member. Therefore, there is the problem that the technique disclosed in JP-A No. 2019-101490 cannot accurately predict the behavior of a vibration proofing member having a non-linear characteristic.

SUMMARY

In view of the above-described circumstances, an object of the present disclosure is to provide a predicting device, a training device, storage medium storing a training program, and a storage medium storing a training program, which can accurately predict the behavior of a vibration proofing member.

A predicting device of a first aspect is a predicting device including: an acquiring section that acquires displacement data that expresses a time series of displacements at respective points in time that are input to a vibration proofing member, and velocity data that expresses a time series of velocities at respective points in time that are input to the vibration proofing member; a first load data generating section that generates first load data of the vibration proofing member by inputting the displacement data and the velocity data acquired by the acquiring section into a model that expresses linear characteristics of the vibration proofing member and that is for inferring, from the displacement data and the velocity data, load data that expresses a load that is output from the vibration proofing member; a second load data generating section that generates second load data of the vibration proofing member by inputting the displacement data and the velocity data acquired by the acquiring section into a regression trained model that has been machine-trained in advance and that expresses non-linear characteristics of the vibration proofing member and that is for inferring, from the displacement data and the velocity data, load data that expresses a load that is generated at the vibration proofing member; and an inferring section that infers load data relating to the vibration proofing member by adding together the first load data generated by the first load data generating section and the second load data generated by the second load data generating section.

In a predicting device of a second aspect, the model that expresses linear characteristics of the vibration proofing member is a dynamic system model, and the regression trained model that expresses non-linear characteristics of the vibration proofing member is a trained regression neural network.

A training device of a third aspect is a training device including: a training data acquiring section that acquires training data that expresses a combination of the displacement data for training that expresses a time series of displacements at respective points in time that are input to the vibration proofing member, velocity data for training that expresses a time series of velocities at respective points in time that are input to the vibration proofing member, and load data that expresses a load generated at the vibration proofing member at a time at which the velocity data for training and the displacement data for training are provided; and a training section that generates a regression trained model for inferring, from the displacement data and the velocity data, load data that expresses a load generated at the vibration proofing member, by machine-training a regression model that expresses non-linear characteristics of the vibration proofing member on the basis of the training data acquired by the training data acquiring section.

The training data acquiring section of a training device of a fourth aspect: generate a spring constant $K_d'$, which corresponds to a non-linear characteristic of the vibration proofing member, by subtracting a spring constant $K_0$, which corresponds to a linear characteristic of the vibration proofing member, from a storage spring constant that expresses a required performance of the vibration proofing member; generate a damping coefficient $C'$, which corresponds to a non-linear characteristic of the vibration proofing member, by subtracting a damping coefficient $C_0$, which corresponds to a linear characteristic of the vibration proofing member, from a damping coefficient that expresses a required performance of the vibration proofing member; compute an absolute spring constant K, which corresponds to a required performance of the vibration proofing member, and a phase θ, which corresponds to a required performance of the vibration proofing member, by transforming the spring constant $K_d'$ corresponding to the non-linear characteristic of the vibration proofing member and the damping coefficient $C'$ corresponding to the non-linear characteristic of the vibration proofing member; compute displacement data x(t) of respective points in time t and velocity data v(t) of respective points in time t that, of the training data, are input-side data, in accordance with the following formula (1) and on the basis of an amplitude of a vibration input to the vibration proofing member and an angular frequency ω of the vibration; compute load data f(t) of respective points in time t that, of the training data, is output side data, in accordance with the following formula (2) and on the basis of the amplitude of the vibration input to the vibration proofing member, the angular frequency ω of the vibration, the absolute spring constant K and the phase θ; and acquire, as the training data, a combination of the displacement data x(t), the velocity data v(t) and the load data f(t).

$$x(t)=a \sin \omega t$$

$$v(t)=dx/dt=a\omega \cos \omega t \qquad (1):$$

$$f(t)=Kx(t+\theta/\omega)=Ka \sin(wt+\theta) \qquad (2):$$

A fifth aspect is a non-transitory storage medium storing prediction program. This program executes a computer to perform processing, the processing comprising: acquiring displacement data that expresses a time series of displacements at respective points in time that are input to a vibration proofing member, and velocity data that expresses a time series of velocities at respective points in time that are input to the vibration proofing member; generating first load data of the vibration proofing member by inputting the acquired displacement data and velocity data into a model that expresses linear characteristics of the vibration proofing member and that is for inferring, from the displacement data and the velocity data, load data that expresses a load generated at the vibration proofing member; generating second load data of the vibration proofing member by inputting the acquired displacement data and velocity data into a regression trained model that has been machine-trained in advance and that expresses non-linear characteristics of the vibration proofing member and that is for inferring, from the displacement data and the velocity data, load data that expresses a load generated at the vibration proofing member; and inferring load data relating to the vibration proofing member by adding together the first load data and the second load data.

A sixth aspect is a non-transitory storage medium storing a training program. This program executes a computer to perform processing, the processing comprising: acquiring training data that expresses a combination of displacement data for training that expresses a time series of displacements at respective points in time that are input to a vibration proofing member, velocity data for training that expresses a time series of velocities at respective points in time that are input to the vibration proofing member, and load data that expresses a load generated at the vibration proofing member at a time at which the velocity data for training and the displacement data for training are provided; and generating a regression trained model for inferring, from the displacement data and the velocity data, load data that expresses a load generated at the vibration proofing member, by machine-training a regression model that expresses non-linear characteristics of the vibration proofing member on the basis of the acquired training data.

In accordance with the present disclosure, there is the effect that the behavior of a vibration proofing member can be predicted accurately.

BRIEF DESCRIPTION OF THE DRAWINGS

An exemplary embodiment of the present disclosure will be described in detail based on the following figures, wherein:

FIG. 7A is a drawing for explaining division into linear characteristics and non-linear characteristics;

FIG. 7B is a drawing for explaining division into linear characteristics and a non-linear characteristics;

FIG. 7C is a drawing for explaining division into linear characteristics and non-linear characteristics;

FIG. 8 is a drawing for explaining an absolute spring constant and a phase;

FIG. 9 is a drawing for explaining a method of storing training data;

FIG. 15 is a drawing showing results of the Examples.

DETAILED DESCRIPTION

Embodiments

Figure 1:
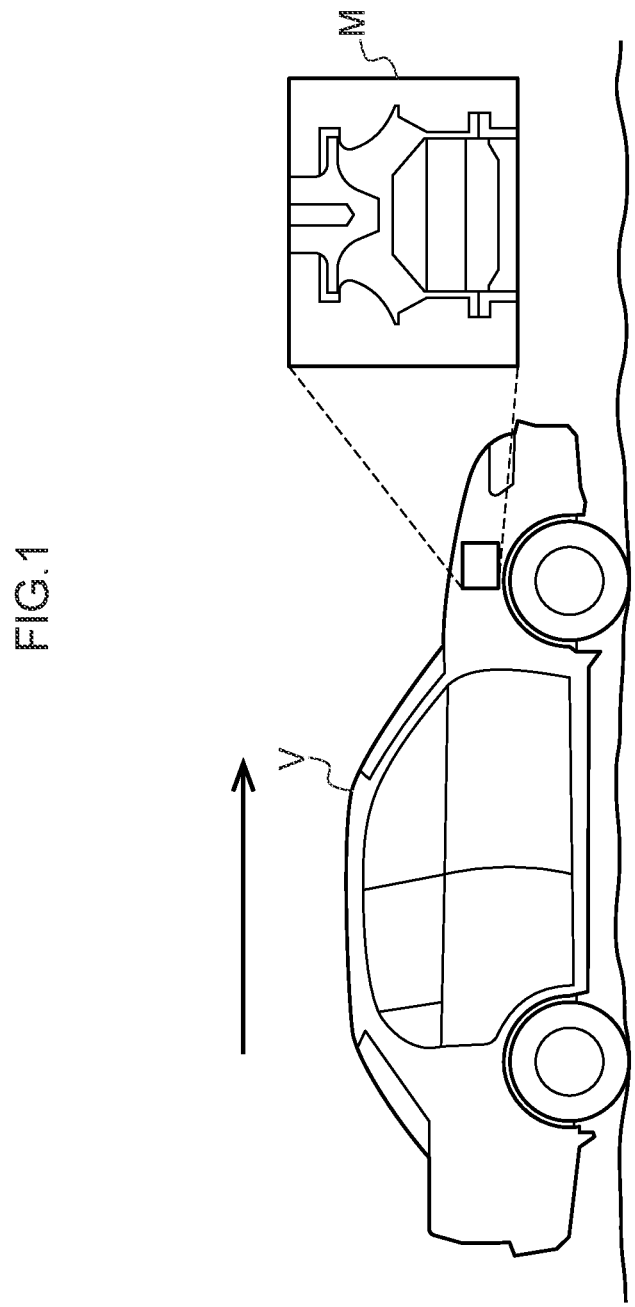
FIG. 1 is a drawing for explaining an independent switching-type liquid sealed mount.

There are cases in which simulation by known 1D-CAE (Computer Aided Engineering) is carried out when predicting the behavior of an independent switching-type liquid sealed mount M that is installed in a vehicle V such as shown in FIG. 1. In this case, non-linear characteristics of the behavior of the independent switching-type liquid sealed mount must be taken into consideration. The independent switching-type liquid sealed mount is an example of the vibration proofing member of a vehicle.

At the time of predicting the behavior of an object, for example, a neural network that is an example of a machine learning model, or the like, is used. Among neural networks, a regression neural network is effective because it can accurately predict the behavior of an object having a non-linear characteristic, by using time series data.

A regression neural network executes processing while taking into consideration data up to the previous point in time. Because a regression neural network executes processing by taking data of current point in time t1 and data of previous point in time t2 into consideration, the data that is output from the regression neural network is dependent on time interval Δt (hereinafter, simply called "sampling time unit Δt") between the current point in time t1 and the previous point in time t2. Therefore, the output data of the regression neural network is a fixed step output of sampling time unit Δt.

With regard to this point, when data, which fluctuates greatly on the time axis such as vibration data or the like, is input into a regression learning model, and the behavior of a vibration proofing member is predicted, the regression learning model cannot properly take into consideration the data up to the previous point in time that fluctuates greatly, and there is the problem that the prediction accuracy deteriorates.

Figure 2:
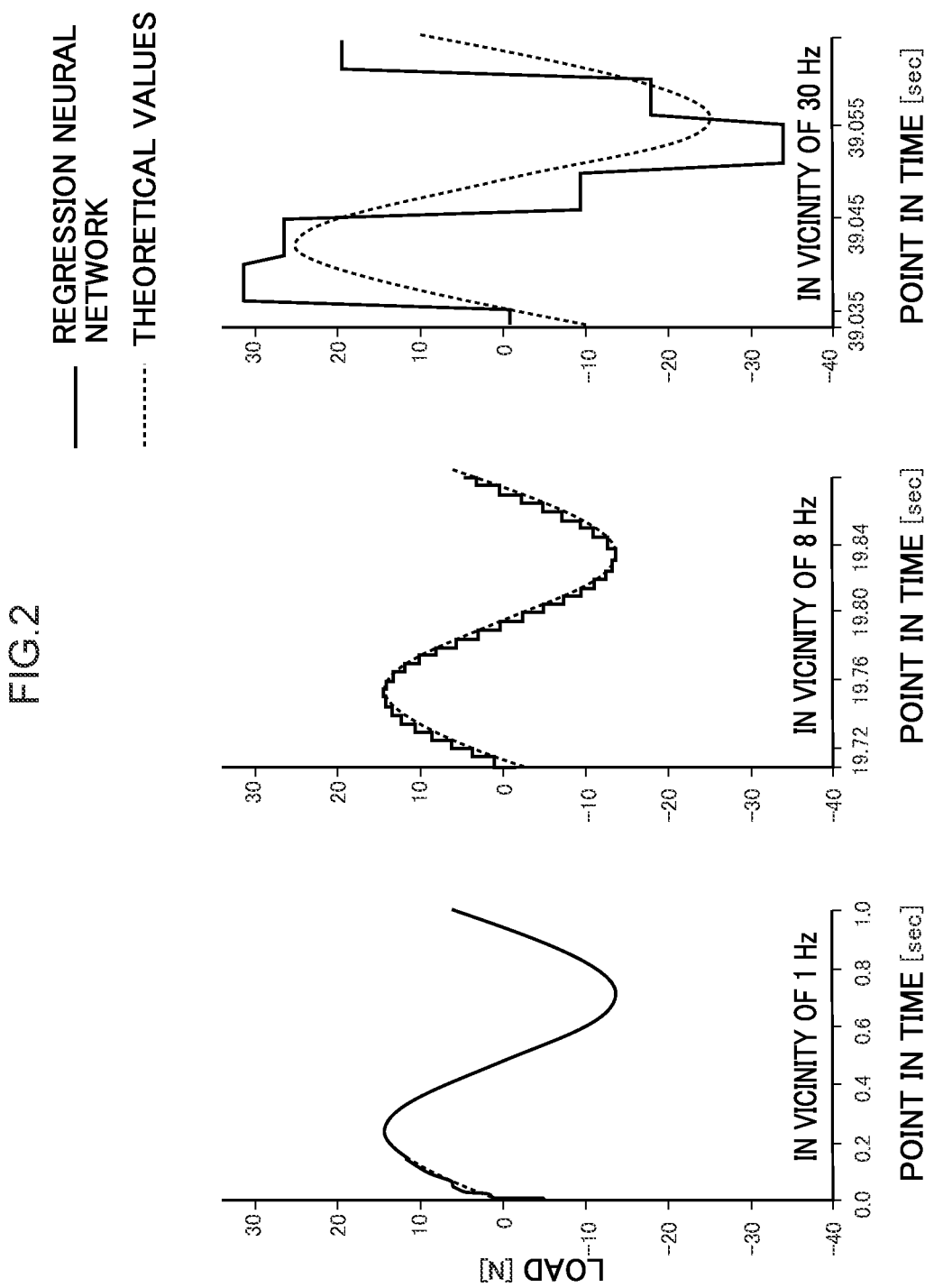
FIG. 2 is an example of results at the time of predicting load that is generated at the independent switching-type liquid sealed mount by using a regression neural network.

An example of the results of prediction of the behavior of an independent switching-type liquid sealed mount by a regression neural network is shown in FIG. 2. FIG. 2 is a drawing showing the results of excitation evaluation of an independent switching-type liquid sealed mount. In the results shown in FIG. 2, the problem, of predicting load that is generated at the independent switching-type liquid sealed mount from the displacement and velocity of the vibration that is input to the independent switching-type liquid sealed mount, is modeled by a regression neural network, and load is predicted from the displacement and velocity of the vibration input to the independent switching-type liquid sealed mount.

As shown in FIG. 2, when the frequency of the input vibration is low ("in vicinity of 1 Hz" in FIG. 2), fluctuations in the time history data also are small, and therefore, the theoretical values and the predicted values of the load of the independent switching-type liquid sealed mount, which predicted values are predicted by the regression neural network, coincide favorably. In contrast, it can be understood that, in cases in which the frequency of the vibration is large ("in vicinity of 8 Hz", "in vicinity of 30 Hz" in FIG. 2), the theoretical values and the predicted values of the load generated at the independent switching-type liquid sealed mount, which predicted values are predicted by the regression neural network, differ greatly.

Figure 3:
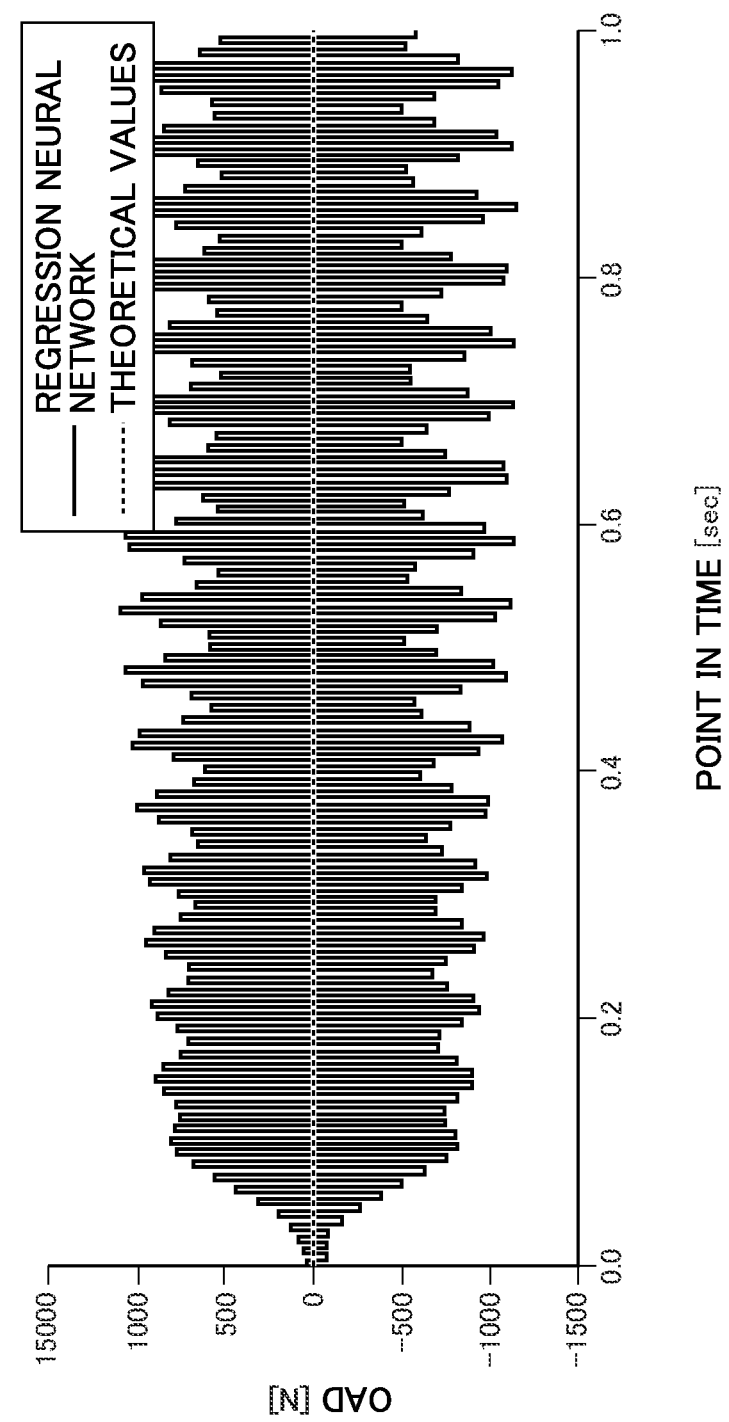
FIG. 3 is an example of results at the time of predicting load that is generated at the independent switching-type liquid sealed mount by using a regression neural network.

FIG. 3 is a drawing showing the results of equilibrium evaluation of the independent switching-type liquid sealed mount. As shown in FIG. 3, regardless of the fact that the theoretical values of the load of the independent switching-type liquid sealed mount are 0, the predicted values of the independent switching-type liquid sealed mount that are predicted by the regression neural network fluctuate significantly both upward and downward, and it can be understood that the predicted values and the theoretical values diverge greatly.

Therefore, there is the problem that, even if the behavior of a vibration proofing member is predicted by simply using a regression neural network, the behavior cannot be predicted accurately.

Thus, in the present embodiment, when modeling the behavior of a vibration proofing member, the linear characteristics and the non-linear characteristics of the vibration proofing member are modeled separately. Concretely, in the present embodiment, linear characteristics of a vibration proofing member are modeled by an existing dynamic system model, and non-linear characteristics of the vibration proofing member are modeled by a regression neural network. As a result, the behavior of the vibration proofing member can be predicted accurately.

The predicting device of the embodiment is described hereinafter by using the drawings.

Figure 4:
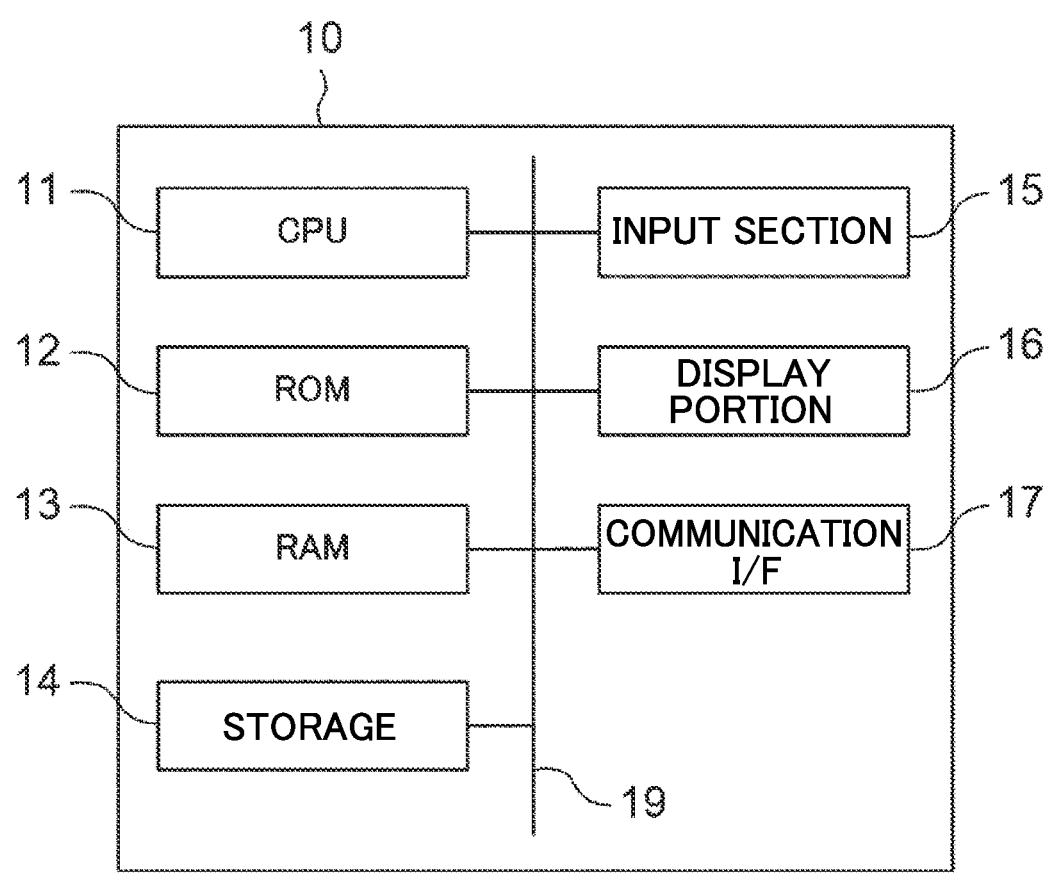
FIG. 4 is a drawing showing an example of hardware structures of a predicting device relating to an embodiment.

FIG. 4 is a block drawing showing an example of the hardware structures of a predicting device 10 relating to the embodiment. As shown in FIG. 4, the predicting device 10 has a CPU (Central Processing Unit) 11, a ROM (Read Only Memory) 12, a RAM (Random Access Memory) 13, a storage 14, an input section 15, a display portion 16, and a communication interface (I/F) 17. The respective structures are connected so as to be able to communicate with one another via a bus 19.

The CPU 11 is a central computing processing unit, and executes various programs and controls respective sections. Namely, the CPU 11 reads-out programs from the ROM 12 or the storage 14, and executes the programs by using the RAM 13 as a workspace. The CPU 11 carries out control of the above-described respective structures and various types of computing processings in accordance with the programs stored in the ROM 12 or the storage 14. The CPU 11 is an example of the processor. In the present embodiment, a training data generating program, a training program, and a predicting program are stored in the ROM 12 or the storage 14.

The ROM 12 stores various programs and various data. The RAM 13 temporarily stores programs or data as a workspace. The storage 14 is structured by an HDD (Hard Disk Drive) or an SSD (Solid State Drive), and stores various programs, including the operating system, and various data.

The input section 15 includes a pointing device such as a mouse or the like, and a keyboard, and is used for carrying out various types of input to the device.

The display portion 16 is a liquid crystal display for example, and displays various types of information. By employing a touch panel type display, the display portion 16 may also function as the input section 15.

The communication interface 17 is an interface for the device to communicate with other external equipment, and, for example, standards of Ethernet®, FDDI (Fiber Distributed Data Interface), Wi-Fi® or the like are used therefor.

The functional structures of the predicting device 10 are described next with reference to FIG. 5.

Figure 5:
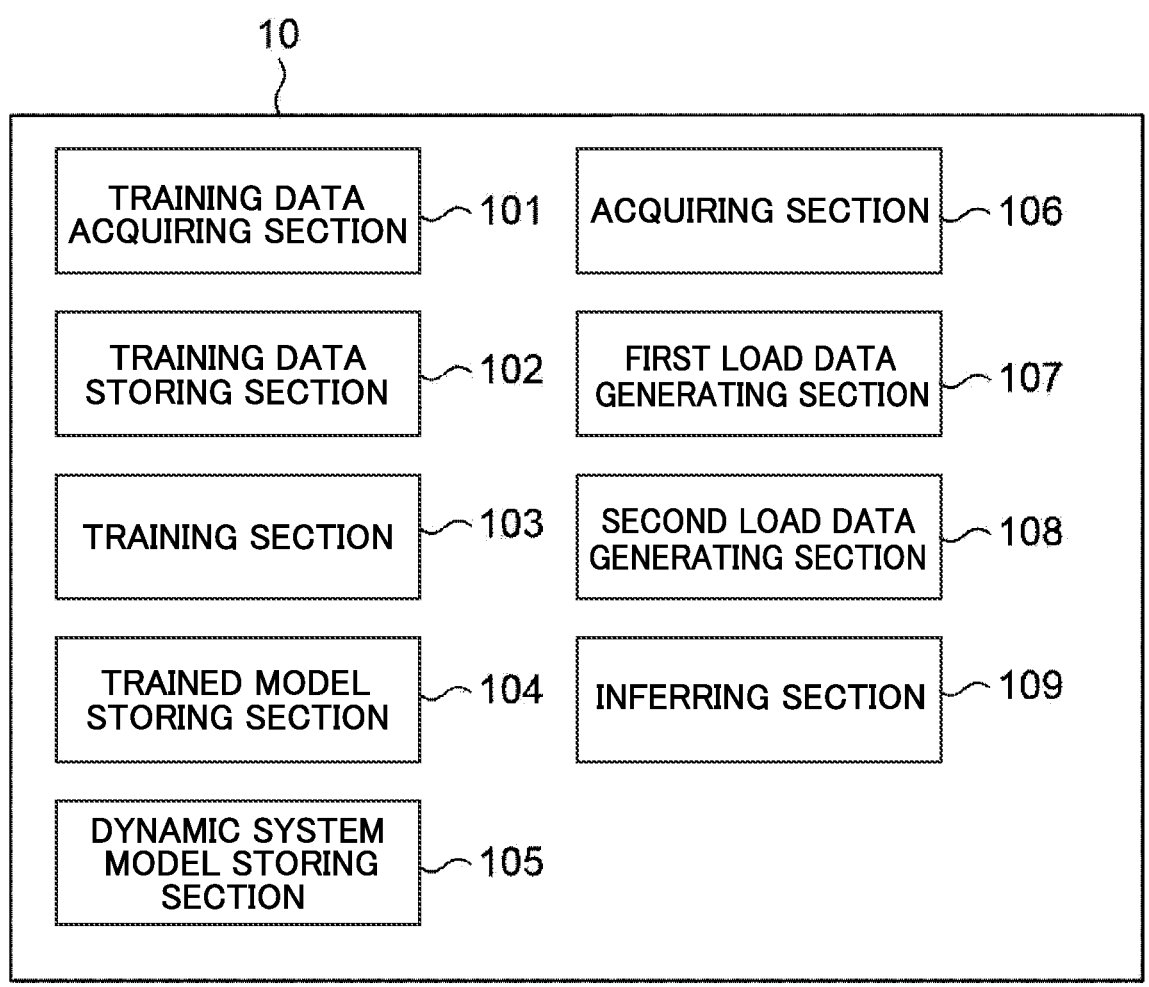
FIG. 5 is a functional block drawing of the predicting device relating to the embodiment.

FIG. 5 is a block drawing showing an example of the functional structures of the predicting device 10 relating to the embodiment. As shown in FIG. 5, the predicting device 10 has a training data acquiring section 101, a training data storing section 102, a training section 103, a trained model storing section 104, a dynamic system model storing section 105, an acquiring section 106, a first load data generating section 107, a second load data generating section 108, and an inferring section 109.

The training data acquiring section 101 generates training data that is for machine-training a regression neural network that is an example of a regression learning model (described below). The training data is data for training a regression neural network that predicts the behavior of a vibration proofing member.

Figure 6:
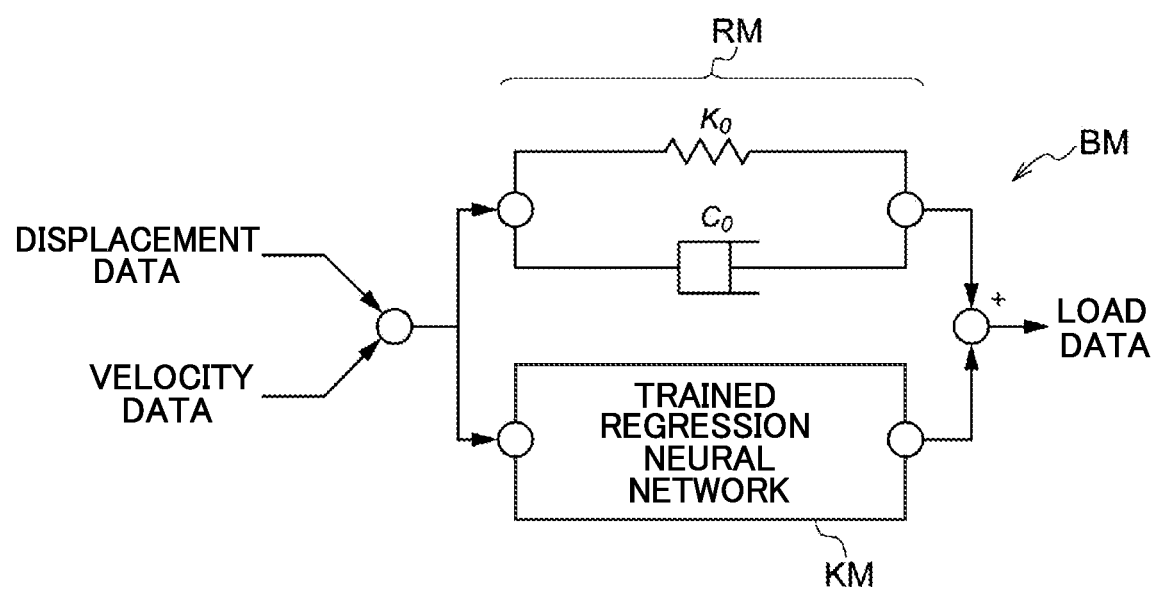
FIG. 6 is a drawing for explaining a vibration proofing member model of the embodiment.

FIG. 6 is a drawing for explaining vibration proofing member model BM of the present embodiment. As shown in FIG. 6, in the present embodiment, the portion of the vibration proofing member, which portion exhibits linear characteristics, is modeled by an existing dynamic system model RM, and the portion of the vibration proofing member, which portion exhibits non-linear characteristics, is modeled by regression neural network KM. Note that an existing regression neural network may be used as the regression neural network.

Concretely, as shown in FIG. 6, a combination of displacement data and velocity data is input to the vibration proofing member model. The displacement data is data expressing the series of displacements of respective points in time that are input to the vibration proofing member. The velocity data is data expressing the series of velocities of respective points in time that are input to the vibration proofing member. Load data, which expresses a load at the time at which a combination of displacement data and velocity data is input to the vibration proofing member, is output from the vibration proofing member model BM. The load data is a data expressing a load of respective points in time that are generated at the vibration proofing member.

Note that the displacement data and the velocity data are input to both the dynamic system model RM and the regression neural network KM of the vibration proofing member model BM. The load data that is output from the vibration proofing member model BM corresponds to the sum of first load data that is output from the dynamic system model RM and second load data that is output from the regression neural network KM.

Concretely, the training data acquiring section 101 generates training data from data expressing required performances of the vibration proofing member, in order to train the regression neural network.

The training data acquiring section 101 generates a spring constant $K_d'$ which corresponds to a non-linear characteristic of the vibration proofing member, by subtracting a spring constant $K_0$, which corresponds to a linear characteristic of the vibration proofing member, from a storage spring constant $K_d$ that expresses a required performance of the vibration proofing member. Further, the training data acquiring section 101 generate a damping coefficient C' which corresponds to a non-linear characteristic of the vibration proofing member, by subtracting a damping coefficient $C_0$, which corresponds to a linear characteristic of the vibration proofing member, from a damping coefficient C that expresses a required performance of the vibration proofing member.

FIG. 7A, FIG. 7B and FIG. 7C are drawings for explaining division into a linear characteristic and a non-linear characteristic.

FIG. 7A is a drawing showing storage a spring constant $K_d$ and a damping coefficient C before division into a linear characteristic and a non-linear characteristic. The upper graph of FIG. 7A is a graph expressing the storage spring constant $K_d$ that expresses a required performance of the vibration proofing member. The lower graph of FIG. 7A is a graph expressing the damping coefficient C that expresses a required performance of the vibration proofing member. Note that a1, a2, a3, a4 in the drawings express the magnitudes of an amplitude of the vibration input to the vibration proofing member. The relationship between amplitudes a1, a2, a3, a4 is a1<a2<a3<a4.

FIG. 7B is a drawing for explaining the before and after of the division into a linear characteristic and a non-linear characteristic. As shown in the upper graph of FIG. 7B, a spring constant $K_d'$ is generated by subtracting the spring constant $K_0$, which corresponds to a linear characteristic of the vibration proofing member, from the storage spring constant $K_d$. Note that the lines that are marked "org" in the upper graph of FIG. 7B express the the storage spring constant $K_d$, and the lines that are marked "sep" express the spring constant $K_d'$ ($K_d'=K_d-K_0$). Further, as shown in the lower graph of FIG. 7B, a damping coefficient C' is generated by subtracting the damping coefficient $C_0$, which corresponds to a linear characteristic of the vibration proofing member, from the damping coefficient C. Note that the lines that are marked "org" in the lower graph of FIG. 7B express the damping coefficient C, and the lines that are marked "sep" express the damping coefficient C' (C'=C−$C_0$).

FIG. 7C is a drawing showing a spring constant $K_d'$ and a damping coefficient C' after the linear characteristics and the non-linear characteristics have been divided.

As shown in FIG. 7A, FIG. 7B and FIG. 7C, by subtracting the spring constant $K_0$ that corresponds to a linear characteristic from the storage spring constant $K_d$, and by subtracting the damping coefficient $C_0$ that corresponds to a linear characteristic from the damping coefficient C, the predicting device 10 removes linear characteristics of the vibration proofing member from these constants. As a result, a spring constant $K_d'$ and a damping coefficient C' that correspond to non-linear characteristics are generated, and training data (described below) is generated using these. Owing to the regression neural network being trained using these training data, a trained regression neural network that corresponds to non-linear characteristics of the vibration proofing member is generated.

The training data acquiring section 101 compute an absolute spring constant K, which corresponds to a required performance of the vibration proofing member and a phase θ, which corresponds to a required performance of the vibration proofing member, by transforming the spring constant $K_d'$ corresponding to the non-linear characteristic of the vibration proofing member and the damping coefficient C' corresponding to the non-linear characteristic of the vibration proofing member, by a known method.

Concretely, on the basis of the damping coefficient C' corresponding to the non-linear characteristic of the vibration proofing member, the training data acquiring section 101 computes $K_i$, which corresponds to respective frequencies f, in accordance with the following formula (2). Then, on the basis of the spring constant $K_d'$ corresponding to the non-linear characteristic of the vibration proofing member and $K_i$ that was computed by formula (2), the training data acquiring section 101 compute an absolute spring constant K in accordance with the following formula (1). Further, on the basis of a spring constant $K_d'$ that corresponds to a non-linear characteristic of the vibration proofing member and $K_i$ that was computed by formula (2), the training data acquiring section 101 compute a phase θ in accordance with the following formula (3).

$$K=\sqrt{K_d'^2+K_i^2} \qquad (1)$$

$$K_i=2\pi f \cdot C' \qquad (2)$$

$$\theta=\arctan(K_i/K_d') \qquad (3)$$

An example of the absolute spring constant K and the phase θ is shown in FIG. 8. As shown in FIG. 8, the absolute spring constant K and the phase θ are computed with respect to the respective frequencies f.

Then, on the basis of an amplitude of a the vibration input to the vibration proofing member, and an angular frequency ω of the vibration, the training data acquiring section 101 computes displacement data x(t) of respective points in time and velocity data v(t) of respective points in time that, of the training data, are the input-side data, in accordance with the following formula (4) and formula (5).

$$x(t)=a \sin \omega t \quad (4)$$

$$v(t)=dx/dt=a\omega \cos \omega t \quad (5)$$

Further, on the basis of the amplitude of a the vibration input to the vibration proofing member, the angular frequency ω of the vibration, the absolute spring constant K and the phase θ, the training data acquiring section 101 computes load data f(t) of respective points in time that, of the training data, is the output side data, in accordance with the following formula (6).

$$f(t)=Kx(t+\theta/w)=Ka \sin(wt+\theta) \quad (6)$$

Then, the training data acquiring section 101 acquires, as the training data, the combination of the displacement data x(t), the velocity data v(t) and the load data f(t).

The training data that is generated by the training data acquiring section 101 is stored in the training data storing section 102. The training data of the present embodiment is data expressing a combination of displacement data for training that expresses the time series of the displacements at respective points in time of the vibration proofing member, velocity data for training that expresses the time series of the velocities at respective points in time of the vibration proofing member, and load data that expresses a load generated at the vibration proofing member at the time at which the velocity data for training and the displacement data for training are provided.

FIG. 9 shows an example of training data that is stored in the training data storing section 102. As shown in FIG. 9, a combination of displacement data, velocity data and load data is stored as one item of training data in the training data storing section 102.

The training section 103 generates a trained regression neural network by machine-training a regression neural network, which expresses non-linear characteristics of the vibration proofing member, on the basis of the training data stored in the training data storing section 102. Then, the training section 103 stores the trained regression neural network that was generated, in the trained model storing section 104.

The trained regression neural network that was generated by the training section 103 is stored in the trained model storing section 104.

A computation formula, which corresponds to a dynamic system model that expresses linear characteristics of the vibration proofing member, is stored in the dynamic system model storing section 105. Concretely, the computation formula corresponding to the dynamic system model is expressed by the following formula (7). Note that the spring constant $K_0$ which corresponds to a linear characteristic and the damping coefficient $C_0$ which corresponds to a linear characteristic are constants.

$$f_s(t)=K_0 x(t)+C_0 v(t) \quad (7)$$

The acquiring section 106 acquires displacement data that expresses the time series of the displacements at respective points in time of the vibration proofing member, and velocity data that expresses the time series of the velocities at respective points in time of the vibration proofing member. The data acquired by the acquiring section 106 is displacement data and velocity data of an object for which load data is to be inferred.

The first load data generating section 107 reads-out the computation formula that corresponds to the dynamic system model that is stored in the dynamic system model storing section 105. Then, the first load data generating section 107 generates first load data of the vibration proofing member by inputting the displacement data and the velocity data, which were acquired by the acquiring section 106, into the read-out dynamic system model. Concretely, the first load data generating section 107 computes first load data fs(t) by using the displacement data x(t) and the velocity data v(t) as inputs in the foregoing formula (7).

The second load data generating section 108 reads-out the trained regression neural network that is stored in the trained model storing section 104. Then, the second load data generating section 108 generates second load data fd(t) by inputting the displacement data x(t) and the velocity data v(t), which were acquired by the acquiring section 106, into the trained regression neural network that was read-out.

The inferring section 109 infers load data that is generated at the vibration proofing member by adding together the first load data fs(t) generated by the first load data generating section 107 and the second load data fd(t) generated by the second load data generating section 108.

Then, the inferring section 109 displays the inferred load data of the vibration proofing member on the display portion 16. Note that, because the load data is time series data, a load that are generated at the vibration proofing member at respective points in time are displayed on the display portion 16.

Operation of the predicting device 10 of the embodiment is described next.

Figure 10:
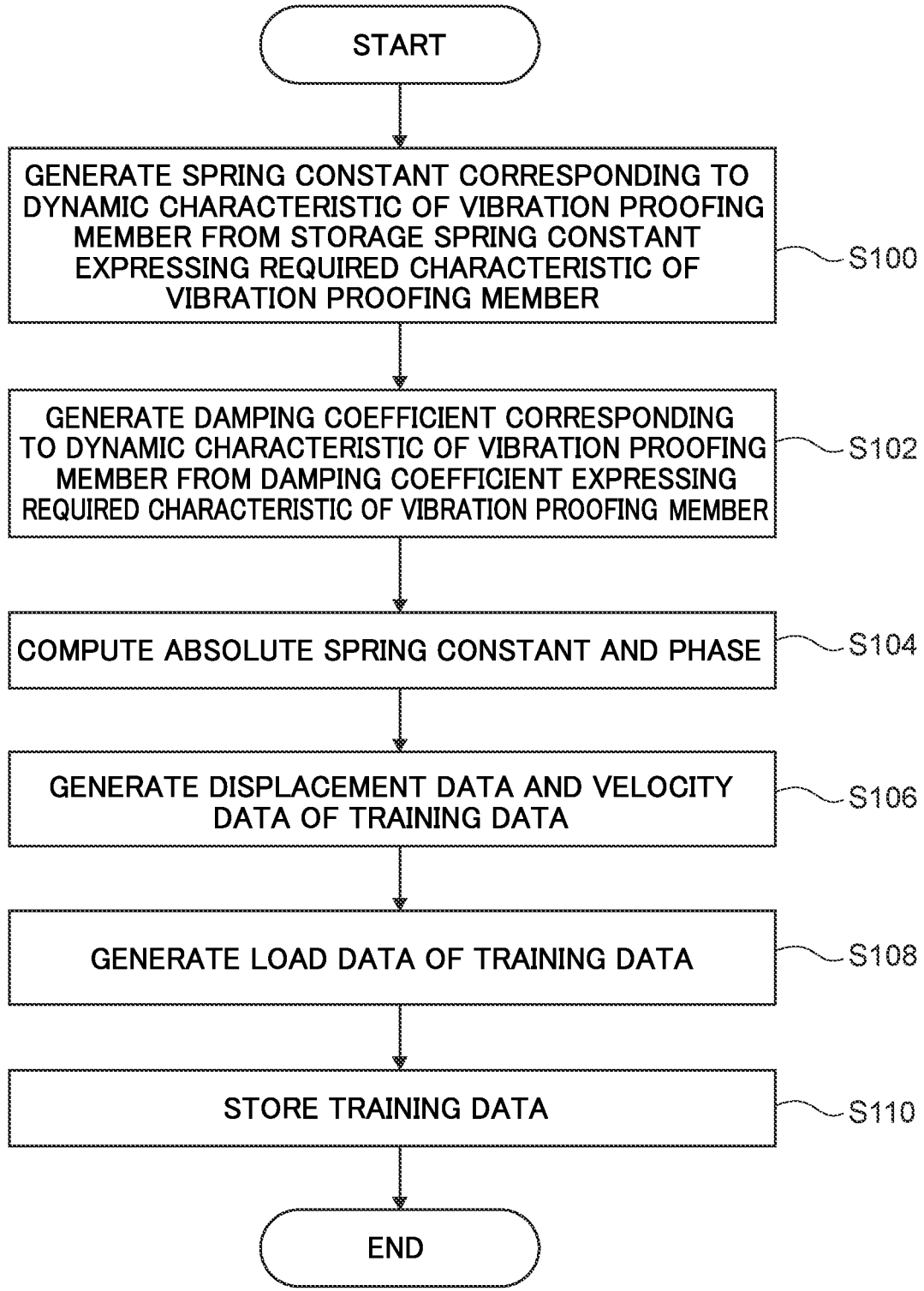
FIG. 10 is a drawing showing an example of a training data generating processing routine of the embodiment.

When data expressing a required performance of a vibration proofing member is input to the predicting device 10, the predicting device 10 executes the training data generating processing routine shown in FIG. 10.

<Training Data Generating Processing Routine>

In step S100, the training data acquiring section 101 generates the spring constant $K_d'$, corresponding to the non-linear characteristic of the vibration proofing member, by subtracting the spring constant $K_0$, which corresponds to a linear characteristic of the vibration proofing member, from the storage spring constant $K_d$ that expresses a required performance of the vibration proofing member.

In step S102, the training data acquiring section 101 generates the damping coefficient C' corresponding to the non-linear characteristic of the vibration damping member, by subtracting the damping coefficient $C_0$, which corresponds to a linear characteristic of the vibration proofing member, from the damping coefficient C which expresses a required performance of the vibration proofing member.

In step S104, the absolute spring constant K which corresponds to a required performance of the vibration proofing member and a phase θ, which corresponds to a required performance of the vibration proofing member are computed by transforming the spring constant $K_d'$ corresponding to the non-linear characteristic of the vibration proofing member and the damping coefficient C' corresponding to the non-linear characteristic of the vibration proofing member, by a known method.

In step S106, on the basis of the amplitude of the vibration input to the vibration proofing member, and the angular frequency ω of the vibration, the training data acquiring section 101 computes the displacement data x(t) of the respective points in time t and the velocity data v(t) of the respective points in time t, which, of the training data, are the input-side data, in accordance with the foregoing formulae (4) and (5).

In step S108, on the basis of the amplitude of a the vibration input to the vibration proofing member, the angular frequency ω of the vibration, the absolute spring constant K and the phase θ, the training data acquiring section 101 computes load data f(t) of the respective points in time t that, of the training data, are the output side data, in accordance with the foregoing formula (6).

In step S110, the training data acquiring section 101 stores, in the training data storing section 102 and as the training data, a combination of the displacement data x(t), the velocity data v(t), and the load data f(t).

Figure 11:
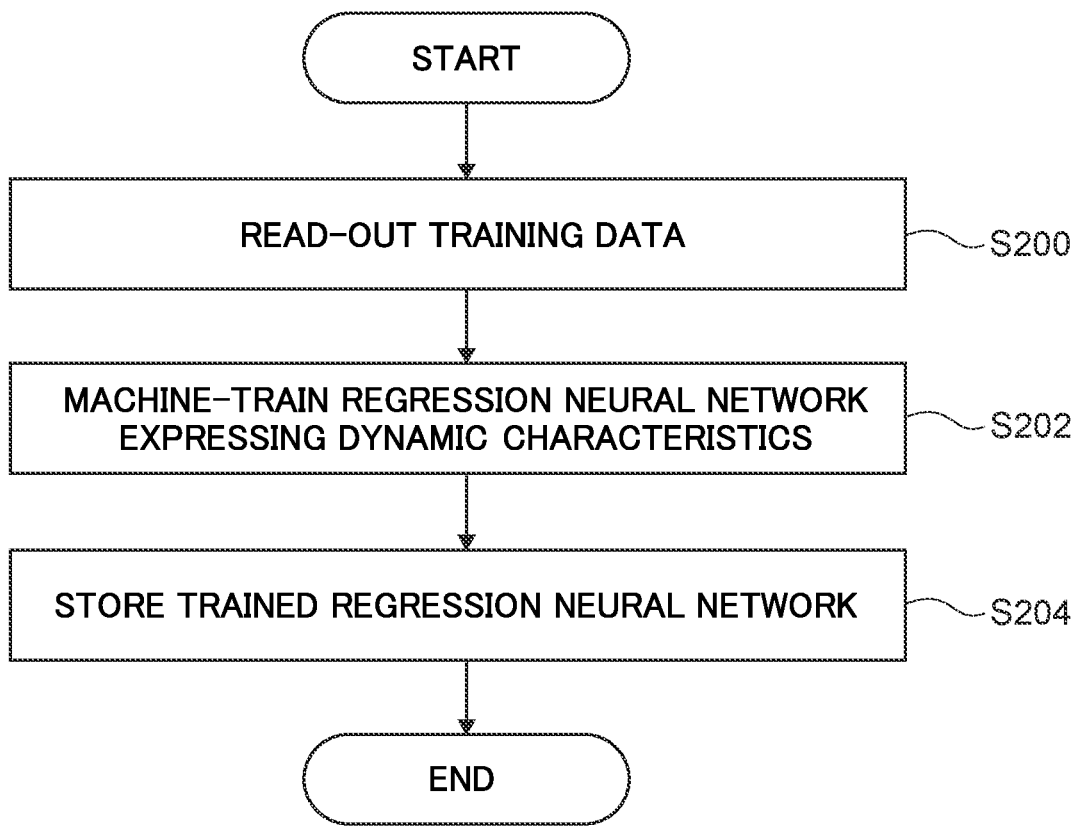
FIG. 11 is a drawing showing an example of a training processing routine of the embodiment.

When the training data is generated by the above-described training data generating processing routine, and this training data is stored in the training data storing section 102, the predicting device 10 executes the training processing routine shown in FIG. 11.

<Training Processing Routine>

In step S200, the training section 103 reads-out the training data that is stored in the training data storing section 102.

In step S202, the training section 103 generates a trained regression neural network by machine-training the regression neural network, which expresses non-linear characteristics of the vibration proofing member, on the basis of the training data stored in the training data storing section 102.

In step S204, the training section 103 stores the trained regression neural network that was generated, in the trained model storing section 104.

Figure 12:
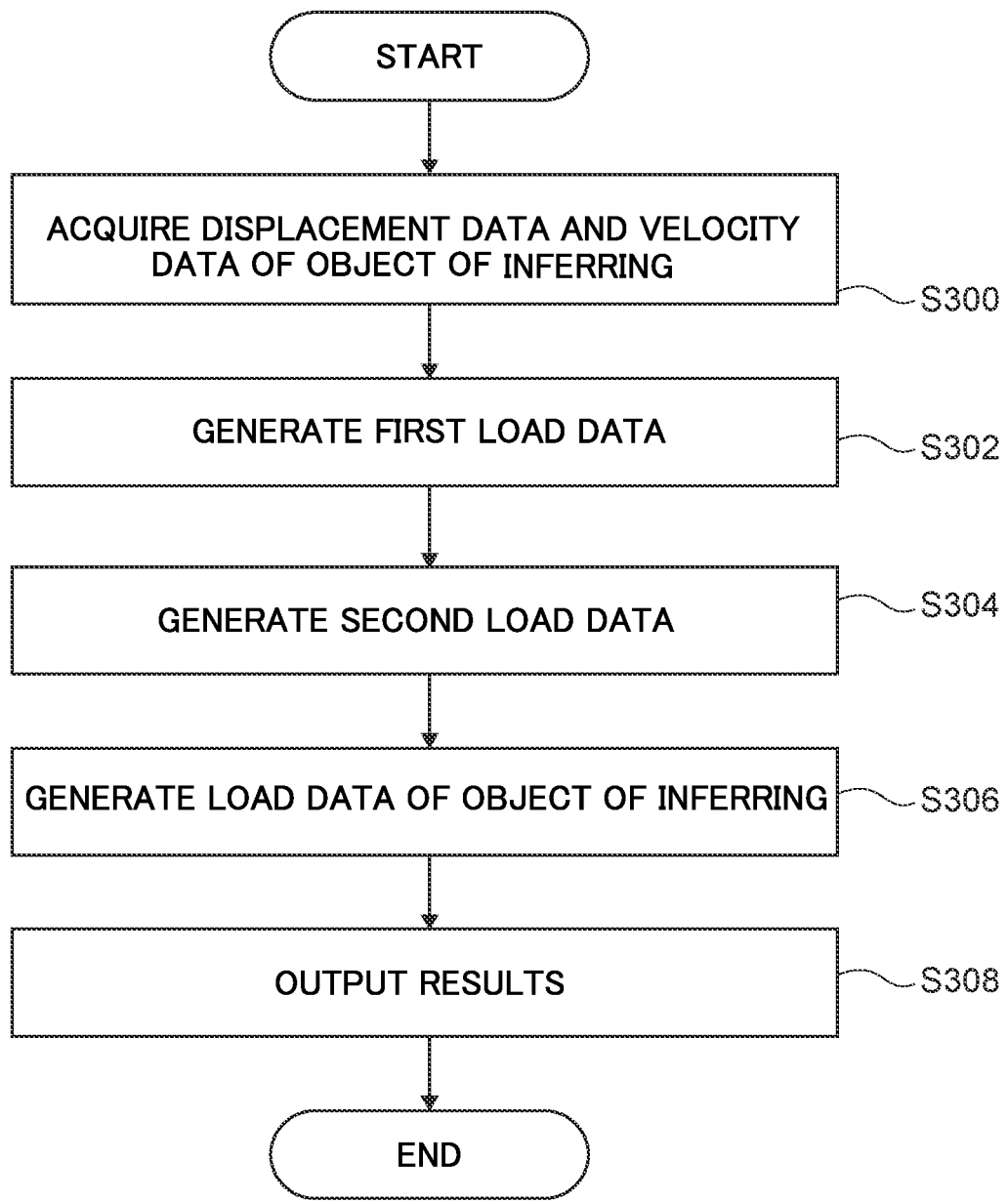
FIG. 12 is a drawing showing an example of a simulation processing routine of the embodiment.

When the trained regression neural network is generated and is stored in the trained model storing section 104 by the above-described training processing routine, the predicting device 10 executes the simulation processing routine shown in FIG. 12.

<Simulation Processing Routine>

In step S300, the acquiring section 106 acquires the displacement data x(t) and the velocity data v(t) of the object for which load data is to be inferred.

In step S302, the first load data generating section 107 reads-out the computation formula that corresponds to the dynamic system model that is stored in the dynamic system model storing section 105. Then, the first load data generating section 107 generates the first load data fs(t) of the vibration proofing member by inputting the displacement data x(t) and the velocity data v(t), which were acquired in above step S300, into the read-out dynamic system model.

In step S304, the second load data generating section 108 reads-out the trained regression neural network that is stored in the trained model storing section 104. Then, the second load data generating section 108 generates the second load data fd(t) of the vibration proofing member by inputting the displacement data x(t) and the velocity data v(t), which were acquired in above step S300, into the trained regression neural network that was read-out.

In step S306, the inferring section 109 infers load data relating to the vibration proofing member by adding together the first load data fs(t) generated in above step S302 and the second load data fd(t) generated in above step S300.

In step S308, the inferring section 109 outputs the inferred load data of the vibration proofing member as the results.

As described above, the predicting device 10 relating to the embodiment acquires displacement data, which expresses the time series of displacements at respective points in time of a vibration proofing member, and velocity data that expresses the time series of velocities at respective points in time of the vibration proofing member. Then, the predicting device 10 generates first load data of the vibration proofing member by inputting the acquired displacement data and velocity data into a model that expresses linear characteristics of the vibration proofing member and that is for inferring, from the displacement data and the velocity data, load data that expresses a load relating to the vibration proofing member. The predicting device 10 generates second load data of the vibration proofing member by inputting the acquired displacement data and velocity data into a regression trained model that has been machine-trained in advance, and that expresses non-linear characteristics of the vibration proofing member and that is for inferring, from the displacement data and the velocity data, load data that expresses a load relating to the vibration proofing member. By adding the first load data and the second load data together, the predicting device 10 infers load data that relates to the vibration proofing member. The behavior of the vibration proofing member can thereby be predicted accurately. Further, the behavior of the vibration proofing member can be predicted stably.

Note that the processings that are carried out at the respective devices in the above-described embodiments have been described as software processings that are carried out by programs being executed, but they may be processings that are carried out by hardware. Or, they may be processings that combine both software and hardware. Further, the programs that are stored in the ROM may be stored on any of various types of storage media and distributed.

Moreover, the present disclosure is not limited to the above, and can of course be implemented by being modified in various ways other than the above within a scope that does not depart from the gist thereof.

For example, the above-described embodiment describes, as an example, a case in which the output side data f(t) of the training data is generated by the formula (6), but the present disclosure is not limited to this. For example, the output side data f(t) of the training data may be generated by the following formula.

$$f(t)=K_d x(t)+Cv(t)$$

EXAMPLES

Examples of the present embodiment are described next.

Figure 13:
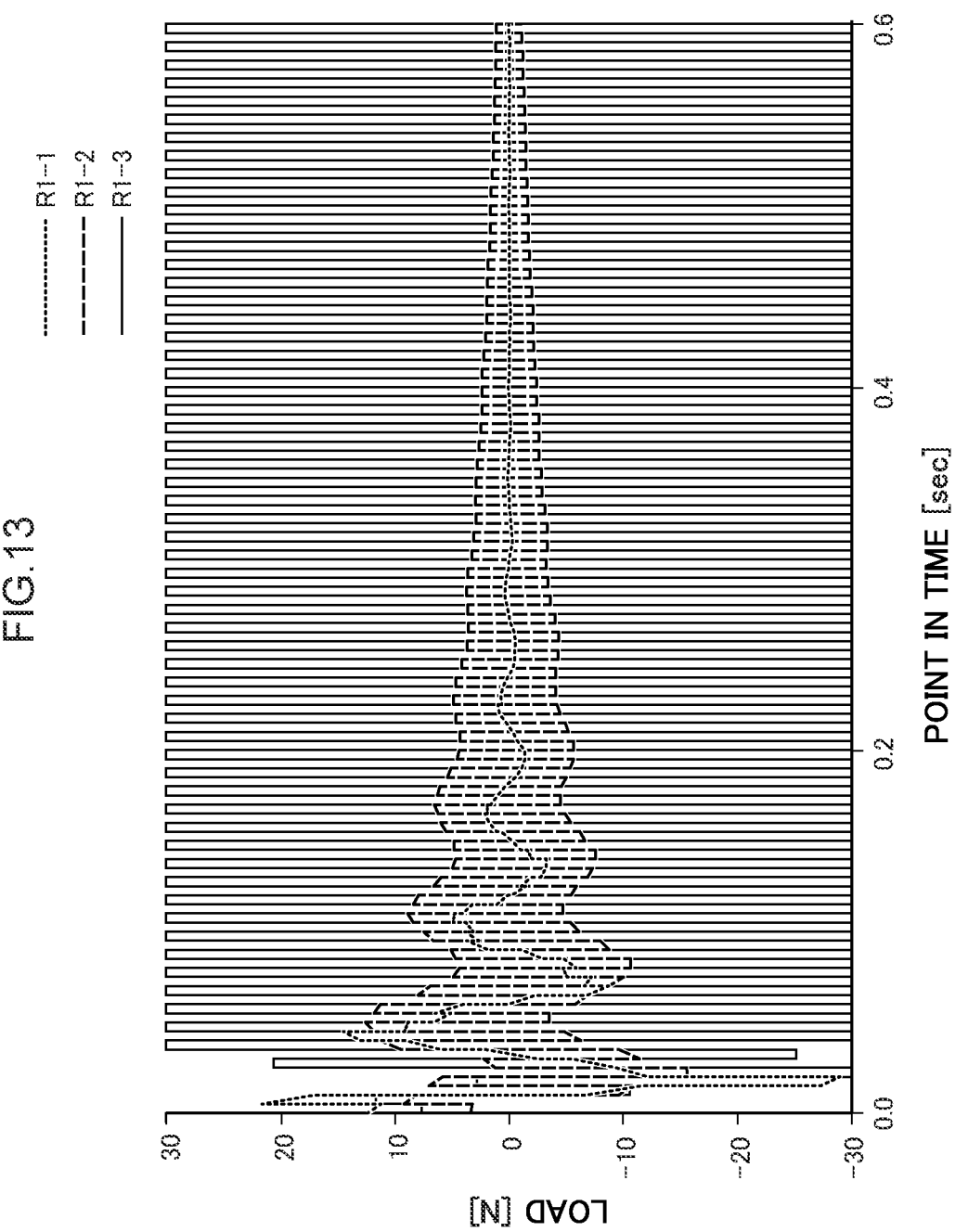
FIG. 13 is a drawing showing results of Examples.

FIG. 13 is a drawing showing the results of equilibrium evaluation of an independent switching-type liquid sealed mount. R1-1 in FIG. 13 is the results in a case in which both the spring constant and the damping coefficient are divided into a non-linear characteristic and a linear characteristic, first load data corresponding to the non-linear characteristics is generated by a dynamic system model, second load data corresponding to the linear characteristics is generated by a regression neural network model, and the sum of the first load data and the second load data is inferred as the load data that is generated at the independent switching type liquid sealed mount. R1-2 is the results when only the spring constant is divided into a non-linear characteristic and a linear characteristic. R1-3 is the results in a case in which load data that is generated at the independent switching type liquid sealed mount is inferred by using a regression neural network without division into non-linear characteristics and linear characteristics.

As shown in FIG. 13, the R1-3 results fluctuate significantly both upward and downward, and load data cannot be inferred properly. In contrast, although the R1-2 results fluctuate up and down, the fluctuations are suppressed as compared with those of R1-3. It can be understood that, in the R1-3 results, there is hardly any up-and-down fluctuation, and the load data can be inferred properly.

Figure 14:
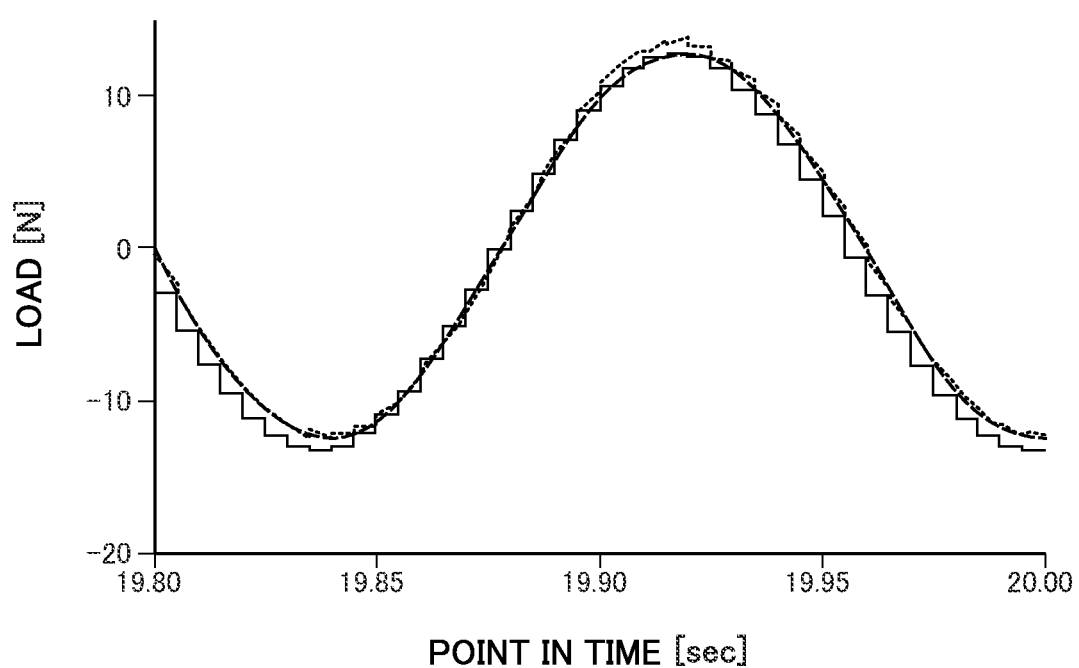
FIG. 14 is a drawing showing results of the Examples.

FIG. 14 is a drawing showing the results of excitation evaluation of an independent switching type liquid sealed mount. R2-1 in FIG. 14 is the results in a case in which both the spring constant and the damping coefficient are divided into a non-linear characteristic and a linear characteristic, first load data corresponding to the non-linear characteristics is generated by a dynamic system model, second load data corresponding to the linear characteristics is generated by a regression neural network model, and the sum of the first load data and the second load data is inferred as the load data that is generated at the independent switching type liquid sealed mount. R2-2 is the results when only the spring constant is divided into a non-linear characteristic and a linear characteristic. R2-3 is the results in a case in which load data that is generated at the independent switching type liquid sealed mount is inferred by using a regression neural network without division into non-linear characteristics and linear characteristics.

As shown in FIG. 14, the R2-3 results are discontinuous results, and load data cannot be inferred properly. In contrast, the R2-2 and R2-3 results fluctuate up and down somewhat, but the fluctuations thereof are suppressed as compared with those of R1-3, and it can be understood that the load data can be inferred properly.

Next, in order to confirm the computational stability, prediction results in accordance with only a regression neural network, and prediction results in accordance with the model of the present embodiment in which there is division into non-linear characteristics and linear characteristics, are compared by using a liquid sealed mount without switching as the test subject.

The 1D-CAE model that is used in testing is a model in which the spring portion of a spring-mass system of a single degree of freedom is replaced with a liquid sealed mount model. In this test, the displacement response at the time at which the mass of the 1D-CAE model is excited is evaluated. By varying the masses of the mass elements to 100/60/30/20 kg, the resonance frequency of the system of a single degree of freedom is gradually raised, and it is qualitatively confirmed whether or not computational stability is affected.

As shown in the table of FIG. 15, it could be confirmed that the model of the present embodiment, which is divided into non-linear characteristics and linear characteristics, has computational stability ("Stable" in the table) with respect to all of the masses. On the other hand, when only a regression neural network was used, the results of computation under the condition of a mass of 20 kg diverged ("Unstable" in the table). In contrast, with the model of the present embodiment that is divided into non-linear characteristics and linear characteristics, computation converges and is stable even under the condition of a mass of 20 kg. Therefore, it was confirmed that the model of the present embodiment that is divided into non-linear characteristics and linear characteristics also has improved computational stability.

What is claimed is:

1. A predicting device, comprising a processor, wherein the processor is configured to:
   acquire displacement data that expresses a time series of displacements at respective points in time that are input to a vibration proofing member, and velocity data that expresses a time series of velocities at respective points in time that are input to the vibration proofing member;
   generate first load data of the vibration proofing member by inputting the acquired displacement data and velocity data into a model that expresses linear characteristics of the vibration proofing member and that is for inferring, from the displacement data and the velocity data, load data that expresses a load that is output from the vibration proofing member;
   generate second load data of the vibration proofing member by inputting the acquired displacement data and velocity data into a regression trained model that has been machine-trained in advance and that expresses non-linear characteristics of the vibration proofing member and that is for inferring, from the displacement data and the velocity data, load data that expresses a load generated at the vibration proofing member;
   infer load data relating to the vibration proofing member by adding together the generated first load data and the generated second load data;
   confirm computational stability based on the inferred load data; and
   output the inferred load data relating to the vibration proofing member.

2. The predicting device of claim 1, wherein:
   the model that expresses linear characteristics of the vibration proofing member is a dynamic system model, and
   the regression trained model that expresses non-linear characteristics of the vibration proofing member is a trained regression neural network.

3. A training device comprising a processor, wherein the processor is configured to:
   acquire training data that expresses a combination of displacement data for training that expresses a time series of displacements at respective points in time that are input to a vibration proofing member, velocity data for training that expresses a time series of velocities at respective points in time that are input to the vibration proofing member, and load data that expresses a load generated at the vibration proofing member at a time at which the velocity data for training and the displacement data for training are provided;
   generate a regression trained model for inferring, from the displacement data and the velocity data, load data that expresses a load generated at the vibration proofing member, by machine-training a regression model that expresses non-linear characteristics of the vibration proofing member on the basis of the acquired training data;
   confirm computational stability based on the inferred load data; and
   output the inferred load data relating to the vibration proofing member.

4. The training device of claim 3, wherein the processor is further configured to:
   generate a spring constant $K_d'$, which corresponds to a non-linear characteristic of the vibration proofing member, by subtracting a spring constant $K_0$, which corresponds to a linear characteristic of the vibration proofing member, from a storage spring constant that expresses a required performance of the vibration proofing member;

generate a damping coefficient C', which corresponds to a non-linear characteristic of the vibration proofing member, by subtracting a damping coefficient $C_0$, which corresponds to a linear characteristic of the vibration proofing member, from a damping coefficient that expresses a required performance of the vibration proofing member;

compute an absolute spring constant K, which corresponds to a required performance of the vibration proofing member, and a phase θ, which corresponds to a required performance of the vibration proofing member, by transforming the spring constant $K_d'$ corresponding to the non-linear characteristic of the vibration proofing member and the damping coefficient corresponding to the non-linear characteristic of the vibration proofing member;

compute displacement data x(t) of respective points in time t and velocity data v(t) of respective points in time t that, of the training data, are input-side data, in accordance with the following formula (1) and on the basis of an amplitude of a vibration input to the vibration proofing member and an angular frequency ω of the vibration;

compute load data f(t) of respective points in time t that, of the training data, is output-side data, in accordance with the following formula (2) and on the basis of the amplitude of the vibration input to the vibration proofing member, the angular frequency ω of the vibration, the absolute spring constant K and the phase θ; and acquire, as the training data, a combination of the displacement data x(t), the velocity data v(t) and the load data f(t):

$$x(t)=a \sin \omega t$$

$$v(t)=dx/dt=a\omega \cos \omega t \quad (1)$$

$$f(t)=Kx(t+\theta/\omega)=Ka \sin(\omega t+\theta). \quad (2)$$

5. The training device of claim 3, wherein the processor is further configured to:

compute the displacement data x(t) of respective points in time t and the velocity data v(t) of respective points in time t that, of the training data, are input-side data, in accordance with the following formula (3) and on the basis of an amplitude of a vibration input to the vibration proofing member and an angular frequency ω of the vibration;

compute load data f(t) of respective points in time t that, of the training data, is output-side data, in accordance with the following formula (4) and on the basis of the amplitude of the vibration input to the vibration proofing member, the angular frequency ω of the vibration, a storage spring constant $K_d$ that expresses a required performance of the vibration proofing member, and a damping coefficient C that expresses a required performance of the vibration proofing member; and acquire, as the training data, a combination of the displacement data x(t), the velocity data v(t) and the load data f(t):

$$x(t)=a \sin \omega t$$

$$v(t)=dx/dt=a\omega \cos \omega t \quad (3)$$

$$f(t)=K_d x(t)+Cv(t). \quad (4)$$

6. A non-transitory storage medium storing a prediction program executable by a computer to perform processing, the processing comprising:

acquiring displacement data that expresses a time series of displacements at respective points in time that are input to a vibration proofing member, and velocity data that expresses a time series of velocities at respective points in time that are input to the vibration proofing member;

generating first load data of the vibration proofing member by inputting the acquired displacement data and velocity data into a model that expresses linear characteristics of the vibration proofing member and that is for inferring, from the displacement data and the velocity data, load data that expresses a load generated at the vibration proofing member;

generating second load data of the vibration proofing member by inputting the acquired displacement data and velocity data into a regression trained model that has been machine-trained in advance and that expresses non-linear characteristics of the vibration proofing member and that is for inferring, from the displacement data and the velocity data, load data that expresses a load generated at the vibration proofing member;

inferring load data relating to the vibration proofing member by adding together the first load data and the second load data;

confirming computational stability based on the inferred load data; and outputting the inferred load data relating to the vibration proofing member.

7. A non-transitory storage medium storing a training program executable by a computer to perform processing, the processing comprising:

acquiring training data that expresses a combination of displacement data for training that expresses a time series of displacements at respective points in time that are input to a vibration proofing member, velocity data for training that expresses a time series of velocities at respective points in time that are input to the vibration proofing member, and load data that expresses a load generated at the vibration proofing member at a time at which the velocity data for training and the displacement data for training are provided;

generating a regression trained model for inferring, from the displacement data and the velocity data, load data that expresses a load generated at the vibration proofing member, by machine-training a regression model that expresses non-linear characteristics of the vibration proofing member on the basis of the acquired training data;

confirming computational stability based on the inferred load data; and outputting the inferred load data relating to the vibration proofing member.

* * * * *